United States Patent
Kellner et al.

(10) Patent No.: US 11,214,901 B2
(45) Date of Patent: Jan. 4, 2022

(54) DISPERSIBLE NON-WOVEN FABRIC AND METHOD FOR PRODUCING THE SAME

(71) Applicant: Glatfelter Gernsbach GmbH, Gernsbach (DE)

(72) Inventors: Jürgen Kellner, Hemsbach (DE); Jörg Kühn, Otigheim (DE)

(73) Assignee: GLATFELTER GERNSBACH GMBH, Gernsbach (DE)

( * ) Notice: Subject to any disclaimer, the term of this patent is extended or adjusted under 35 U.S.C. 154(b) by 412 days.

(21) Appl. No.: 15/502,965

(22) PCT Filed: Aug. 10, 2015

(86) PCT No.: PCT/EP2015/068345
§ 371 (c)(1),
(2) Date: Feb. 9, 2017

(87) PCT Pub. No.: WO2016/023856
PCT Pub. Date: Feb. 18, 2016

(65) Prior Publication Data
US 2017/0233912 A1    Aug. 17, 2017

(30) Foreign Application Priority Data
Aug. 12, 2014   (EP) ................................ 14180701

(51) Int. Cl.
*D04H 1/492*    (2012.01)
*D04H 1/425*    (2012.01)
(Continued)

(52) U.S. Cl.
CPC ............. *D04H 1/492* (2013.01); *D04H 1/425* (2013.01); *D04H 1/4258* (2013.01); *D04H 1/43835* (2020.05); *D21H 27/002* (2013.01)

(58) Field of Classification Search
CPC ......... D06M 10/001; A61K 8/63; A61K 8/31; A61K 8/68; A61K 8/19; A61K 8/97;
(Continued)

(56) References Cited

U.S. PATENT DOCUMENTS

| | | |
|---|---|---|
| 4,425,126 A | 1/1984 | Butterworth et al. |
| 5,976,694 A | 11/1999 | Tsai et al. |

(Continued)

FOREIGN PATENT DOCUMENTS

| | | |
|---|---|---|
| CA | 2 843 522 A1 | 1/2013 |
| CN | 102459757 A | 5/2012 |

(Continued)

OTHER PUBLICATIONS

T 234 cm-02, Coarseness of Pulp Fibers URL:http://research.cnr.ncsu.edu/wpsanalytical/documents/T234.PDF, retrieved on Jan. 13, 2015.

(Continued)

*Primary Examiner* — Elizabeth C Imani
(74) *Attorney, Agent, or Firm* — Blank Rome LLP

(57) ABSTRACT

The present invention relates to a dispersible non-woven fabric, a method for producing a dispersible non-woven fabric and a wipe or tissue. The dispersible non-woven fabric comprises natural pulp fibers in an amount of from 70 to 90 wt.-% based on the total weight of the non-woven fabric and cellulosic fibers in an amount of from 10 to 30 wt.-% based on the total weight of the non-woven fabric. At least a part of the pulp fibers and of the cellulosic fibers are entangled with each other. At least 20% of the natural pulp fibers have a fiber coarseness of from 1.0 to 2.0 dtex.

13 Claims, 2 Drawing Sheets

(51) Int. Cl.
  *D04H 1/4258* (2012.01)
  *D21H 27/00* (2006.01)
  *D04H 1/4382* (2012.01)
(58) Field of Classification Search
  CPC .......... A61K 8/553; A61K 8/922; A61K 8/24; A61K 8/4986; A61K 2800/87; A61K 2800/81; A61Q 3/00
  See application file for complete search history.

(56) References Cited

U.S. PATENT DOCUMENTS

| | | | |
|---|---|---|---|
| 7,718,036 B2 | 5/2010 | Sumnicht et al. | |
| 7,732,357 B2* | 6/2010 | Annis .................. | A61K 8/0208 28/104 |
| 8,057,636 B2 | 11/2011 | Vinson et al. | |
| 8,426,031 B2 | 4/2013 | Zwick et al. | |
| 2008/0196188 A1 | 8/2008 | Brunner et al. | |
| 2012/0080155 A1 | 4/2012 | Konishi et al. | |
| 2012/0199301 A1* | 8/2012 | Strandqvist .............. | D04H 1/26 162/146 |
| 2016/0244916 A1 | 8/2016 | Neogi et al. | |
| 2016/0266916 A1 | 9/2016 | Morelli et al. | |

FOREIGN PATENT DOCUMENTS

| | | |
|---|---|---|
| CN | 102665510 A | 9/2012 |
| DE | 698 26 504 T2 | 3/2005 |
| DE | 10 2005 029 597 A1 | 12/2006 |
| DE | 10 2010 009 134 B3 | 7/2011 |
| EP | 0 303 528 A1 | 2/1989 |
| EP | 0 373 974 A2 | 6/1990 |
| EP | 0 308 320 B1 | 11/1993 |
| EP | 0 602 881 A1 | 6/1994 |
| EP | 1 024 225 A1 | 8/2000 |
| EP | 1 091 042 A1 | 4/2001 |
| EP | 1 138 823 A1 | 10/2001 |
| EP | 1 302 146 A2 | 4/2003 |
| EP | 1 302 592 A1 | 4/2003 |
| EP | 2 441 869 A1 | 4/2012 |
| WO | WO 92/08834 A1 | 5/1992 |
| WO | WO 02/22352 A1 | 3/2002 |
| WO | WO 2007/070147 A1 | 6/2007 |
| WO | WO 2011/046478 A1 | 4/2011 |
| WO | WO 2012/175269 A2 | 12/2012 |

OTHER PUBLICATIONS

A. M. Scallan et al., "A Technique for Determining the Transverse Dimensions of the Fibres in Wood", vol. 5(4) 1974, pp. 323-333.
J. Li, "How Much Should the Yield of Softwood Chemical Pulp (Kraft Pulp) Be Improved? Limitations From Physical Strength", Report to the Member Companies of the Institute of Paper Science and Technology, Apr. 1999, pp. 1-39.
Vliesstoffe, "Zweite Auflage ", 2012, Wiley-VCH, pp. 26-30.
R. A. Horn, "Morphology of Wood Pulp Fiber from Softwoods and Influence on Paper Strength." USDA Forest Service Research Paper FPL 242, 1974. U.S. Department of Agriculture Forest Service, Forest Products Laboratory, Madison, Wisconsin.
Cantor, "Temap—Helping You Solve the Fibre Puzzle." Dec. 18, 2017.
R.S. Seth, "The Effect of Fiber Length and Coarseness on the Tensile Strength of Wet Webs: A Statistical Geometry Explanation." Tappi Journal, vol. 78, No. 3, pp. 99-102, Mar. 1995.
P. Watson et al., "Canadian Pulp Fibre Morphology: Superiority and Considerations for End Use Potential." The Forestry Chronicle, vol. 85, No. 3, pp. 401-408, May/Jun. 2009.
Stoff4you, "Rayon" https://www.stoff4you.de/stoff-lexikon/rayon/, pp. 1-2, Jan. 3, 2014.
Excerpt of Lecture Notes, pp. 1-2, Mar. 8, 2011, E. Gruber: Fundamentals of Pulp Technology Lecture Notes on the Course Paper Technology at the Dual University in Karlsruhe.
Wikipedia Excerpt "NBSK—Northern Bleached Softwood Kraft" Jan. 25, 2018.
Minutes of Oral Proceedings for EP Application No. 14 180 701.6.
Bichard et al. "An evaluation of the comparative performance of the Kajaani FS-100 and FS-200 fiber length analyzers" Dec. 1988, Tappi Journal, pp. 149-155.
Kajaani FS-200 User, Calibration, W4200420 V2.0, p. 11.1(2)-11.2(2).
T. Fahnemann, "A Vision for the Textile Industry in Europe." Lenzinger Berichte, vol. 84, pp. 1-7, 2005.
H. Weber, "Overview on Latest Developments in Viscose Industry." Lenzinger Berichte, vol. 84, pp. 8-16, 2005.
D. Mingguo et al., "Science Innovation & Environmental Protection." Lenzinger Berichte, vol. 84, pp. 17-21, 2005.
S.Y. Long, "New Developments in the Use of Additives in the Viscose Industry." Lenzinger Berichte, vol. 84, pp. 22-26, 2005.
G. Nagel et al., "Oxidation of Reducing End Groups in Celluloses According to Different Protocols." Lenzinger Berichte, vol. 84, pp. 27-35, 2005.
A. Slater, "Tencel—The Key to High Performance Nonwoven Products." Lenzinger Berichte, vol. 84, pp. 36-41, 2005.
M. Einzmann et al., "Tailor-Made Absorbent Cellulose Fibers for Nonwovens." Lenzinger Berichte, vol. 84, pp. 42-49, 2005.
N. Mao et al., "Structure-Process-Property Relationships of Hydroentangled Fabrics." Lenzinger Berichte, vol. 84, pp. 50-61, 2005.
C. Michels et al., "Contribution to the Dissolution State of Cellulose and Cellulose Derivatives." Lenzinger Berichte, vol. 84, pp. 62-70, 2005.
G. Laus et al., "Ionic Liquids: Current Developments, Potential and Drawbacks for Industrial Applications." Lenzinger Berichte, vol. 84, pp. 71-85, 2005.
F. Hermanutz et al., "New Cellulosic Materials Produced by Thermoplastic Processing of Silylcellulose." Lenzinger Berichte, vol. 84, pp. 86-91, 2005.
F. Wendler et al., "Evidence of Autocatalytic Reactions in Cellulose/NMMO Solutions with Thermal and Spectroscopic Methods." Lenzinger Berichte, vol. 84, pp. 92-102, 2005.
M.J. Hayhurst, et al., "Observations on Lyocell Fibre Formation." Lenzinger Berichte, vol. 84, pp. 103-109, 2005.
T. R. Burrow, "Recent Advances in Chemically Treated Lyocell Fibres." Lenzinger Berichte, vol. 84, pp. 110-115, 2005.
H. B. Ozturk et al., "Splitting Tendency of Cellulosic Fibres." Lenzinger Berichte, vol. 84, pp. 123-129, 2005.
P. Navard, "The European Polysaccharide Network of Excellence (EPNOE)." Lenzinger Berichte, vol. 84, pp. 126-130, 2005.
Södra, Product Information Sheet "Green Z", Jun. 2012.
H. Nanko et al., "The World of Market Pulp." 2005, p. iv, viii, 70, 75, and 140-171.
Property Sheet for Canfor IC Pulp, Copyright 2013.
Presentation on the joint project of Trützschler and Voith, Apr. 2013.
Extract of a Table of Contacts Between Trützschler/Voith, Between Apr. and Jun. 2013.
Letter dated Sep. 5, 2013 confirming delivery of Canfor ECF 90 Softwood Pulp to Voith Paper GmbH & Co. KG.
Invoice for the Delivery of the Cantor EGF 90 Softwood Pulp to Voith Paper GmbH & Co. KG, Shipping Date of Sep. 5, 2013.
Extract of a Table re. the Delivery of Rolls (Web of Wet-Laid) from Voith to Trützschler, Oct. 15, 2013.
Production Record for "Roll 110", Oct. 10, 2013.
Letter Dated Jan. 21, 2014 from Trüzschler to Kimberly-Clark re. Samples D13-0122 No64/R110.
Photograph of Samples received by Kimberly-Clark from Trützschler, incl. D13-0122 No64/R110.
Affidavit of Cornelia Bielß of Trützschler re. Roll 110.
Affidavit of Mr. Thomas Weigert of Trüzscler re. Roll 110.
Affidavit of Mr. Benjamin Kavanagh of Kimberly-Clark re. Samples.
Calculation of Specific Strength for the Examples Listed in E1 (EP 0 303 528 A1), Table 1.
Summary of Pulp Properties from B1 "The World of Market Pulp." Nanko et al. 2005.
Letter dated Nov. 1, 2013 from Trützschler to Suominen Nonwovens re. Roll 110.

(56) References Cited

OTHER PUBLICATIONS

Document showing the Date (Nov. 1, 2013) of letter from Trützschler to Suominen Nonwovens re. Roll 110.
G. Robertson et al., "Measurement of Fiber Length, Coarseness, and Shape with the Fiber Quality Analyzer." Tappi Journal, pp. 93-98, Oct. 1999.
D. Guay et al., "Comparison of Fiber Length Analyzers." Tappi Practical Papermaking Conference Proceedings, May 2005.
S. Schlager et al., "Dispersible Nonwovens from Lenzing Lyocell Shortcut and Pulp." Lenzing, Innovative by Nature, 2019.
Article 100 b) EPÜ, Oct. 2, 2019.
Letter of the Opponent 01 dated Oct. 7, 2019 Affidavit of Mr. Thomas Weigert (B13).
Appellant: Suominen Corporation Appeal Against the Decision of the Opposition Division to Reject the Opposition dated Oct. 7, 2019.
Opponent Kimberly-Clark Worldwide, Inc. Grounds for Appeal dated Oct. 4, 2019.

* cited by examiner

DISPERSIBLE NON-WOVEN FABRIC AND METHOD FOR PRODUCING THE SAME

CROSS-REFERENCE TO RELATED APPLICATIONS

This application is a U.S. national phase designation of PCT/EP2015/068345, filed Aug. 10, 2015, which claims priority to EP application 14180701.6, filed Aug. 12, 2014, the disclosures of which are incorporated by reference herein in their entireties.

FIELD OF THE INVENTION

The present invention relates to a dispersible non-woven fabric, a method for producing a dispersible non-woven fabric and wipes or tissues comprising the dispersible non-woven fabric. In particular, the dispersible non-woven fabric may have a high strength in the wet state, but may be capable of being readily decomposed and dispersed in water upon flushing.

BACKGROUND

Disposable wipes, such as wet toilet wipes or baby wipes, are very popular for cleaning the skin of human bodies or facilities in the household because of their comfort for consumers and efficacy in cleaning. However, the convenience of using such products is commonly impaired if they have to be disposed in a waste bin. It is therefore desired that such products can be readily flushed by a toilet and removed by the sewage system.

For being suitable as a flushable wipe, some partly opposing characteristics have to be fulfilled. On the one hand, flushable wipes need to maintain their mechanical strength during manufacturing, storage and use, in particular they should have a sufficiently high (tear) strength in the wet state, i.e. wet strength. On the other hand, for being flushable without clogging the drain system, they should readily disperse or disintegrate by applying a relatively low mechanical energy in the toilet. In addition, it is desired for environmental reasons that the components of the flushable wipes are substantially biodegradable.

Conventional means for imparting wet strength to a non-woven fabric include the application of a wet-strength agent or a binder to the non-woven fabric or the inclusion of thermoplastic fibers in the fiber web of the non-woven fabric. However, the application of a wet-strength agent or a binder typically results in a non-woven fabric that cannot be sufficiently dispersed when flushed in a toilet leading to clogging and blockages of the sewage system. Likewise, the presence of thermoplastic fibers in the non-woven fabric significantly impairs its dispersibility in a sewage system. In addition, since these conventional means are typically of synthetic origin, the resulting products are not substantially biodegradable.

Some efforts have been made in the past to provide flushable wipes:

WO 2007/070147 A1 discloses a dispersible wet wipe comprising a fibrous material and a binder composition comprising a triggerable polymer. The triggerable polymer is described to selectively provide the wet wipe with the desired in-use strength, while also providing it with the ability to loose sufficient strength when disposed in a toilet so as to become flushable. The triggerable polymer may in particular be an ion-sensitive polymer, such as a copolymer of acrylates bearing ionic groups. However, such polymers are not biodegradable and thus involve environmental problems when disposed in a sewage system.

Another approach for providing water-disintegratable non-woven fabrics resides in the inclusion of highly beaten and/or fibrillated fibers in the fiber web of the non-woven fabric, as proposed for instance in EP 1 024 225 A1, EP 1 091 042, EP 1 138 823 A1, EP 1 302 146 A2, EP 1 302 592 A1 and EP 2 441 869 A1. However, the combined improvement in dispersibility and wet strength of the fabric are not yet satisfactory and the provision of highly beaten and/or fibrillated fibers involves an additional process step increasing the total cost of the products.

OBJECTS OF THE INVENTION

The present invention aims at overcoming the above described problems and drawbacks. Thus, it is an object of the present invention to provide a novel dispersible non-woven fabric having a sufficiently high strength in the wet state (such as comparable to or better than those comprising a binder, a wet-strength agent and/or thermoplastic fibers), but which is capable of being readily decomposed and dispersed in water upon flushing in a toilet. In addition, the dispersible non-woven fabric is desired to be substantially, in particular completely, biodegradable so as to avoid any environmental impact when dispersed through a sewing system. Moreover, it is desired that the non-woven fabric can be easily and cost-efficiently prepared.

SUMMARY OF THE INVENTION

The present inventors have made diligent studies for solving these objects and have found that when trying to provide a dispersible non-woven fabric free from wet-strength agent, binder and thermoplastic or other synthetic fibers, such as a dispersible non-woven fabric completely based on cellulose, these objects can be solved by using fibers in specific amounts and having specific morphologies and (hydro)entangling the fibers, as explained in further detail below.

In particular, it has been shown that fibers having a relatively low fiber coarseness (such as fine fibers and in particular light(weight) fibers) can positively influence the wet strength without impairing the dispersibility of the fabric. The strength of the fabric is typically obtained by entangling the fibers, such as through hydroentanglement. It is usually expected that for imparting strength by hydroentanglement, the fiber length needs to be relatively high, such as 10 mm or more. However, fine long fibers tend to easily spin upon hydroentanglement leading to an inacceptable visual appearance of the resulting fabric.

The present inventors have surprisingly found that relatively short and fine/light fibers may also be entangled by water-jet treatment whereby unexpectedly a significant increase of the wet strength can be achieved without impairing the dispersibility of the fabric. Hereby, the increase in wet strength is to such an extent that the amount of long fibers can be reduced. Thereby, the occurrence of an inacceptable visual appearance can be avoided, a sufficiently high wet strength can be maintained and the dispersibility of the non-woven fabric can be improved.

Accordingly, the present invention relates to a dispersible non-woven fabric, comprising natural pulp fibers in an amount of from 70 to 90 wt.-% based on the total weight of the non-woven fabric, wherein at least 20% of the natural pulp fibers have a fiber coarseness of from 1.0 to 2.0 dtex, and cellulosic fibers in an amount of from 10 to 30 wt.-% based on the total weight of the non-woven fabric, wherein at least a part of the pulp fibers and of the cellulosic fibers are entangled with each other.

The present invention further relates to a method for producing a dispersible non-woven fabric, comprising the steps of (a) forming a fibrous web comprising 70 to 90 wt.-% of natural pulp fibers and 10 to 30 wt.-% of cellulosic fibers, (b) entangling at least a part of the pulp fibers and of the cellulosic fibers with each other by subjecting the fibrous web to a water-jet treatment, and (c) drying the entangled fibrous web, wherein at least 20% of the natural pulp fibers have a fiber coarseness of from 1.0 to 2.0 dtex.

In addition, the present invention further relates to a wipe or tissue comprising or consisting of the dispersible non-woven fabric as described herein.

Other objects and many of the attendant advantages of embodiments of the present invention will be readily appreciated and become better understood by reference to the following detailed description of embodiments and the accompanying drawings.

DETAILED DESCRIPTION OF THE INVENTION

Figure 1:
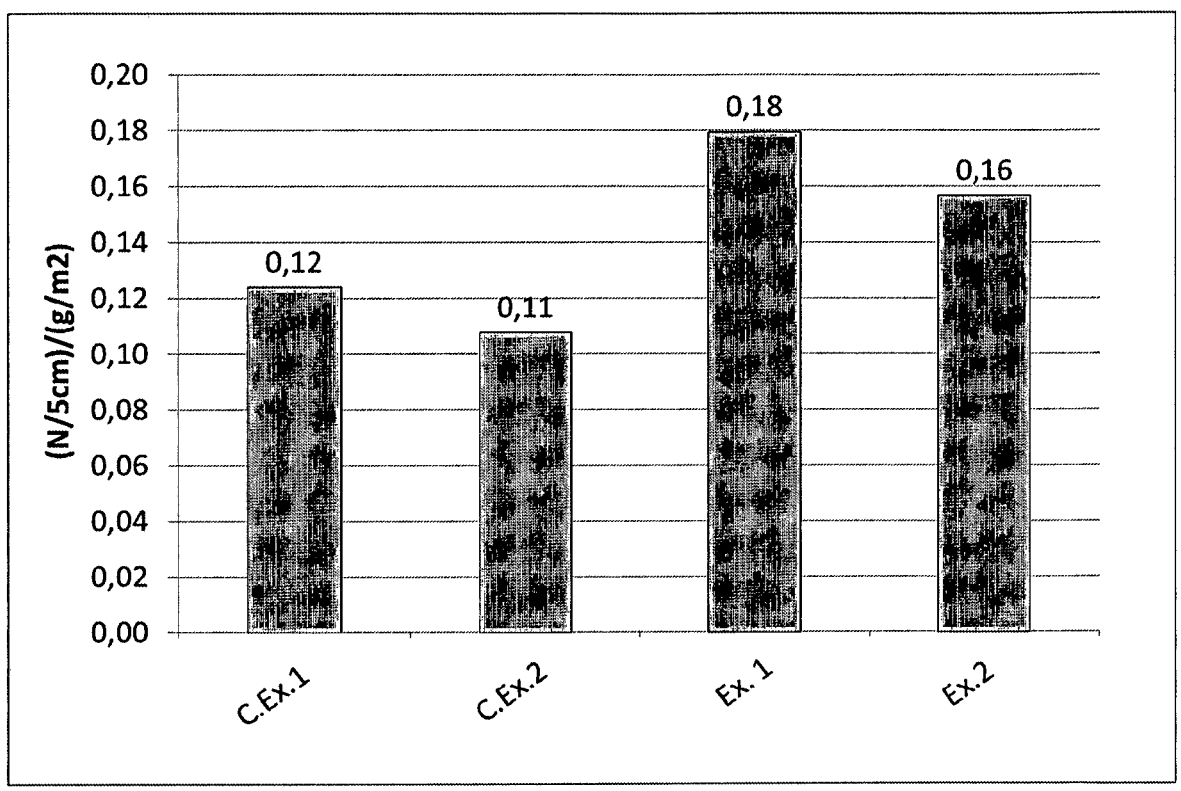
FIG. 1 is a graphical illustration of the experimental results of the test for specific strength of non-woven fabrics.

Hereinafter, details of the present invention and other features and advantages thereof will be described. However, the present invention is not limited to the following specific descriptions, but they are rather for illustrative purposes only.

It should be noted that features described in connection with one exemplary embodiment or exemplary aspect may be combined with any other exemplary embodiment or exemplary aspect, in particular features described with any exemplary embodiment of a dispersible non-woven fabric may be combined with any exemplary embodiment of a method for producing a dispersible non-woven fabric or with any exemplary embodiment a wipe or tissue and vice versa, unless specifically stated otherwise.

Where an indefinite or definite article is used when referring to a singular term, such as "a", "an" or "the", a plural of that term is also included and vice versa, unless specifically stated otherwise.

The expression "comprising", as used herein, includes not only the meaning of "comprising", "including" or "containing", but also encompasses "consisting essentially of" and "consisting of".

In a first aspect, the present invention relates to a dispersible non-woven fabric.

The term "non-woven fabric", as used herein, may in particular mean a web of individual fibers which are intertwined, but not in a regular manner as in a knitted or woven fabric.

The term "dispersible", as used herein, may in particular denote the property of the non-woven fabric to be capable of disintegrating or decomposing in water by applying a relatively low mechanical energy, such as a situation that typically occurs in a toilet upon flushing. In particular, when being flushed, the non-woven fabric may be no longer intact, for instance a certain amount of individual fibers or of fiber aggregates may be released from the fabric and/or the fabric may break to several pieces.

The dispersible non-woven fabric comprises natural pulp fibers and cellulosic fibers. In particular, the non-woven fabric may (essentially) consist of natural pulp fibers and cellulosic fibers.

The term "natural pulp fibers", as used herein, may in particular denote pulp fibers of natural origin, in contrast to synthetic pulp fibers, such as polyethylene pulp (PE pulp). Pulp may in particular denote a (lignocellulosic) fibrous material prepared by chemically or mechanically separating cellulose fibers from wood or the like, such as by a kraft process (sulfate process).

The dispersible non-woven fabric comprises the natural pulp fibers in an amount of from 70 to 90 wt.-% based on the total weight of the non-woven fabric, in particular in an amount of from 72 to 88 wt.-%, in particular in an amount of from 74 to 86 wt.-%, in particular in an amount of from 75 to 85 wt.-%, in particular in an amount of from 76 to 84 wt.-%, in particular in an amount of from 77 to 83 wt.-%, in particular in an amount of from 78 to 82 wt.-%, such as in an amount of approximately 80 wt.-%.

At least 20% (such as at least 20% by number and/or at least 20 wt.-%) of the natural pulp fibers comprised in the dispersible non-woven fabric have a fiber coarseness of from 1.0 to 2.0 dtex. The fiber coarseness is defined as the weight per unit length of the fiber. A fiber coarseness of 1 dtex corresponds to 100 mg/km.

In an embodiment, at least 20%, in particular at least 25%, in particular at least 30%, in particular at least 40%, in particular at least 50%, in particular at least 60%, in particular at least 70%, in particular at least 75%, in particular at least 80%, in particular at least 85%, in particular at least 90%, in particular at least 95%, in particular 100%, of the natural pulp fibers comprised in the dispersible non-woven fabric have a fiber coarseness of from 1.0 to 2.0 dtex, in particular of from 1.05 to 1.9 dtex, in particular of from 1.1 to 1.8 dtex, in particular of from 1.15 to 1.7 dtex, in particular of from 1.2 to 1.6 dtex, in particular of from 1.25 to 1.5 dtex, in particular of from 1.27 to 1.4 dtex, in particular of from 1.28 to 1.35 dtex, in particular approximately 1.30 dtex. It is to be understood that any combination thereof is herewith disclosed. For instance, in an embodiment, at least 50% of the natural pulp fibers comprised in the dispersible non-woven fabric have a fiber coarseness of from 1.1 to 1.8 dtex.

In an embodiment, the natural pulp fibers may comprise softwood pulp (fibers). Softwood pulp may in particular denote pulp of wood from gymnosperm trees, such as pinewood or coniferous wood. In an embodiment, the natural pulp fibers may comprise pulp fibers from conifers. Such fibers have proven to be of particular suitability for providing a non-woven fabric having sufficient wet strength and dispersibility.

In an embodiment, the natural pulp fibers may have an average fiber length of from 1.0 mm to 4.0 mm, in particular of from 1.2 mm to 3.8 mm, in particular of from 1.4 mm to 3.6 mm, in particular of from 1.5 mm to 3.5 mm, in particular of from 1.8 mm to 3.3 mm, in particular of from 2.0 mm to 3.2 mm. It is to be understood that the fiber lengths of the natural pulp fibers may be subject to a Gaussian distribution, for instance substantially all of the individual natural pulp fibers may have a fiber length within the range of more than 0 mm to approximately 7 mm. It might be advantageous that the fiber lengths of the individual natural pulp fibers may be substantially uniform, i.e.

that the fiber length distribution of the individual natural pulp fibers may be relatively narrow.

The dispersible non-woven fabric further comprises cellulosic fibers in an amount of from 10 to 30 wt.-% based on the total weight of the non-woven fabric.

The term "cellulosic fibers", as used herein, may in particular denote fibers based on cellulose, in particular (natural) cellulose fibers or modified cellulose fibers, such as fibers prepared from cellulose.

In an embodiment, the cellulosic fibers may be selected from the group consisting of cellulose fibers and regenerated cellulose fibers. In particular, the cellulosic fibers may be (natural) cellulose fibers.

The term "regenerated cellulose fibers", as used herein, may in particular denote manmade cellulose fibers obtained by a solvent spinning process.

In an embodiment, the regenerated cellulose fibers may be selected from the group consisting of viscose (rayon) or lyocell.

Viscose is a type of solvent spun fiber produced according to the viscose process typically involving an intermediate dissolution of cellulose as cellulose xanthate and subsequent spinning to fibers.

Lyocell is a type of solvent spun fiber produced according to the aminoxide process typically involving the dissolution of cellulose in N-methylmorpholine N-oxide and subsequent spinning to fibers.

The dispersible non-woven fabric comprises the cellulosic fibers in an amount of from 10 to 30 wt.-% based on the total weight of the non-woven fabric, in particular in an amount of from 12 to 28 wt.-%, in particular in an amount of from 14 to 26 wt.-%, in particular in an amount of from 15 to 25 wt.-%, in particular in an amount of from 16 to 24 wt.-%, in particular in an amount of from 17 to 23 wt.-%, in particular in an amount of from 18 to 22 wt.-%, such as in an amount of approximately 20 wt.-%.

In an embodiment, the cellulosic fibers may have a fiber length of from 8 to 14 mm, in particular of from 8.5 to 13.5 mm, in particular of from 9 to 13 mm, in particular of from 9.5 to 12.5 mm, in particular of from 10 to 12 mm.

In an embodiment, the cellulosic fibers may have a fiber coarseness of from 0.5 to 4.0 dtex, in particular of from 0.5 to 2.0 dtex.

In the dispersible non-woven fabric, at least a part of the pulp fibers and of the cellulosic fibers are entangled with each other.

The term "at least a part of", as used herein, may in particular mean at least 1% thereof, in particular at least 2.5% thereof, in particular at least 5% thereof, in particular at least 10% thereof, in particular at least 15% thereof, in particular at least 20% thereof, in particular at least 25% thereof, in particular at least 30% thereof, in particular at least 35% thereof, in particular at least 40% thereof, in particular at least 45% thereof, in particular at least 50% thereof, in particular at least 55% thereof, in particular at least 60% thereof, in particular at least 65% thereof, in particular at least 70% thereof, in particular at least 75% thereof, in particular at least 80% thereof, in particular at least 85% thereof, in particular at least 90% thereof, in particular at least 95% thereof, in particular at least 98% thereof, and may also mean 100% thereof.

The term "entangled", as used herein, may in particular mean that fibers are at least partly intertwined with each other, thereby imparting strength, such as tear strength or tensile strength, to the non-woven fabric. Entangling of fibers might in particular be achieved by a treatment of a fibrous web with water jets, as will be explained in further detail below, which may also be referred to as "hydroentanglement" and the fibers may thus be referred to as "hydroentangled fibers".

The grammage or basis weight of the dispersible non-woven fabric is not particularly limited. Typically, the dispersible non-woven fabric may have a grammage of from 8 to 120 g/m$^2$, such as from 20 to 100 g/m$^2$, such as from 50 to 80 g/m$^2$.

While not excluded, it is not required that the natural pulp fibers and/or the cellulosic fibers are beaten and/or fibrillated fibers. Rather, the natural pulp fibers and/or the cellulosic fibers may be unbeaten fibers and/or non-fibrillated fibers.

In an embodiment, the non-woven fabric does not comprise a binder, or comprises substantially no binder, such as a polymeric binder, for instance a styrene/acrylate copolymer. The term "binder", as used herein, may in particular denote a chemical compound that is able to bind (e.g. by forming covalent bonds, by ionic interactions or the like) to two or more fibers, thereby interconnecting the fibers, resulting in an increased tensile strength of the web or fabric. With regard to embodiments comprising "substantially no binder", binders if any may still be present in relatively minor amounts of up to 3, up to 2, or up to 1 wt.-% based on the total weight of the non-woven fabric.

In an embodiment, the non-woven fabric does not comprise thermoplastic (synthetic) fibers, or comprises substantially no thermoplastic (synthetic) fibers, such as polyethylene fibers, polypropylene fibers, polyester fibers, bicomponent fibers, and the like. The term "thermoplastic fibers", as used herein, may in particular denote fibers that soften and/or partly melt when exposed to heat and are capable to bind with each other or to other non-thermoplastic fibers, such as cellulose fibers, upon cooling and resolidifying. With regard to embodiments comprising "substantially no thermoplastic (synthetic) fibers", thermoplastic (synthetic) fibers, if any, may still be present in relatively minor amounts of up to 10, up to 5, or up to 2 wt.-% based on the total weight of the non-woven fabric.

In an embodiment, the non-woven fabric does not comprise a wet-strength agent, or comprises substantially no wet-strength agents, such as a polyamine-polyamide-epichlorohydrine resin, a melamine-formaldehyde resin, isocyanates, and the like. The term "wet-strength agent", as used herein, may in particular denote a synthetic agent that improves the tensile strength of the non-woven web in the wet state. With regard to embodiments comprising "substantially no wet-strength agents", wet-strength agents, if any, may be present in relatively minor amounts of up to 1, up to 0.5, or up to 0.1 wt.-% based on the total weight of the non-woven fabric.

In an embodiment, the non-woven fabric may be treated (impregnated) with a liquid or a lotion. In other words, the non-woven fabric may further comprise a liquid or a lotion. In such situation, the non-woven fabric may in particular represent a wet wipe or wet tissue. The liquid or the lotion is not particularly limited, and any liquid or lotion customary in the field of wet wipes or wet tissues may be applied. Typically, the liquid or the lotion may comprise a solvent, such as water, an alcohol, or mixtures thereof, surfactants or detergents, skin care agents, emollients, humectants, perfumes, preservatives etc. depending on the intended use.

In a second aspect, the present invention relates a method for producing a dispersible non-woven fabric, in particular of a dispersible non-woven fabric according to the first aspect described herein.

The method comprises the steps of:
(a) forming a fibrous web comprising 70 to 90 wt.-% of natural pulp fibers and 10 to 30 wt.-% of cellulosic fibers, wherein at least 20% of the natural pulp fibers have a fiber coarseness of from 1.0 to 2.0 dtex;
(b) entangling at least a part of the pulp fibers and of the cellulosic fibers with each other by subjecting the fibrous web to a water-jet treatment; and
(c) drying the entangled fibrous web.

In step (a), the fibrous web may be prepared for instance by a conventional paper-making process using a paper machine, such as an inclined wire paper machine, or a dry-forming air-laid non-woven manufacturing process. A conventional paper-making process is described for instance in US 2004/0129632 A1, the disclosure of which is incorporated herein by reference. A suitable dry-forming air-laid non-woven manufacturing process is described for instance in U.S. Pat. No. 3,905,864, the disclosure of which is incorporated herein by reference. Thus, the fibrous web may be formed for instance by a wet-laid process or an air-laid process.

In an embodiment, the fibrous web is formed by a wet-laid process. The natural pulp fibers and the cellulosic fibers may be mixed in advance and wet-laid in one or more plies. It is also possible that the natural pulp fibers are wet-laid in one ply and the cellulosic fibers are wet-laid in another ply.

In step (b), at least a part of the pulp fibers and of the cellulosic fibers are entangled with each other by subjecting the fibrous web to a water-jet treatment.

The term "water-jet treatment", as used herein, may in particular mean a process of mechanically entangling fibers by giving the fibrous web an impact with jets of water. Water-jet treatment may also be referred to as hydroentanglement or spunlacing. Water-jet treatment typically involves the ejection of fine, high pressure jets of water from a plurality of nozzles on a fibrous web provided on a conveyor belt or papermaking wire. The water jets penetrate the web, hit the belt where they may be reflected and pass again the web causing the fibers to entangle. Thus, by subjecting the fibrous web to the water-jet treatment, the fibers are entangled, in particular hydroentangled.

The drying of step (c) is not particularly limited and any drying process and drying equipment customary in the field of papermaking can be used.

The method for producing a dispersible non-woven fabric may also involve a patterning of the non-woven fabric or web. For instance, the non-woven fabric or web may be patterned in the course of step (b) by appropriately selecting the water-jet treatment conditions and apparatus. It may also be possible to provide the non-woven fabric with a pattern in a separate step, in particular between steps (b) and (c) and/or after step (c), for instance by embossing, such as hot embossing, the web or fabric. Thus, in an embodiment, the dispersible non-woven fabric may be a patterned dispersible non-woven fabric.

In a third aspect, the present invention relates to a wipe or tissue comprising or consisting of the dispersible non-woven fabric as described herein. In particular, the non-woven fabric according to the present invention may be usable as a wipe or a tissue.

In an embodiment, the wipe or tissue may be a dry wipe or dry tissue. Dry wipes may be particularly suitable for use as kitchen tissue and paper towel, enabling the soakage of liquids.

In an embodiment, the wipe or tissue may be a wet wipe or wet tissue. For instance, the wet wipe may be treated with a liquid or a lotion, as described in further detail above. Wet wipes may be particularly suitable for cleaning the skin of a human body, including the private parts thereof. Thus, wet wipes may be particularly suitable for use as toilette wipes, toilet tissues, facial wipes or baby wipes.

In an embodiment, the wipe or tissue is selected from the group consisting of toilette wipes, toilet tissues, facial wipes, cosmetic wipes, baby wipes, sanitary wipes, kitchen tissue, paper towel, handkerchiefs (facial tissue), cleaning tissue and cleansing tissue.

The present invention is further described by the following examples, which are solely for the purpose of illustrating specific embodiments, and are not construed as limiting the scope of the invention in any way.

EXAMPLES

Non-woven webs have been prepared by wet-laying the fibers components as indicated below and subsequently hydroentangling the fibers.

Comparative Example 1 (C.Ex. 1)

non-woven fabric comprising thermoplastic fibers

Comparative Example 2 (C.Ex. 2)

80 wt.-% natural pulp fibers (2.5 dtex, 3.2 mm fiber length)
20 wt. % cellulose fibers (1.7 dtex, 12 mm fiber length)

Example 1 (Ex. 1)

80 wt.-% natural pulp fibers (1.3 dtex, 2.8 mm fiber length)
20 wt. % cellulose fibers (1.7 dtex, 12 mm fiber length)

Example 2 (Ex. 2)

40 wt.-% natural pulp fibers (2.5 dtex, 3.2 mm fiber length)
40 wt.-% natural pulp fibers (1.3 dtex, 2.8 mm fiber length)
20 wt.% cellulose fibers (1.7 dtex, 12 mm fiber length)

Test for Specific Strength:
The specific strength of non-woven fabrics in the wet state was calculated according to the following formula:

$$\text{Specific strength} = (MD \text{ tensile strength} + CD \text{ tensile strength})/(2 \cdot \text{weight})$$

MD tensile strength: tensile strength in machine direction
CD tensile strength: tensile strength in cross machine direction The CD and MD wet tensile strengths were determined using sample strips of the non-woven fabric having a width of 5 cm at a moisture of 200%, similar to the test method described in ISO 9073-3.

The results for the specific strength are shown in FIG. 1. As it is evident from these results, non-woven fabrics comprising natural pulp fibers, at least a part of which having a fiber coarseness of from 1.0 to 2.0 dtex (Examples 1 and 2), exhibit a significantly higher specific strength in the wet state than non-woven fabrics comprising natural pulp fibers having a higher fiber coarseness (Comparative Example 2). The specific strength in the wet state of the non-woven fabrics of Examples 1 and 2 is even higher than that of a non-woven fabric comprising thermoplastic fibers (Comparative Example 1).

Test for Dispersibility:

The dispersibility of non-woven fabrics was tested in accordance with a tube box test as follows:

Square samples of the non-woven fabric of 10 cm×10 cm are put into a tube filled with 700 ml water. The tube is ca. 500 mm high and has an ID of 73 mm. The tube rotates by 180 degree and the mechanical agitation of water disperses the sample. Ca. 1 sec is needed for the 180 degree turn, then stopped for 1 sec, then 1 sec for another 180 degree turn, then 1 sec to wait (=1 full rotation). The number of full rotations are recorded.

Figure 2:
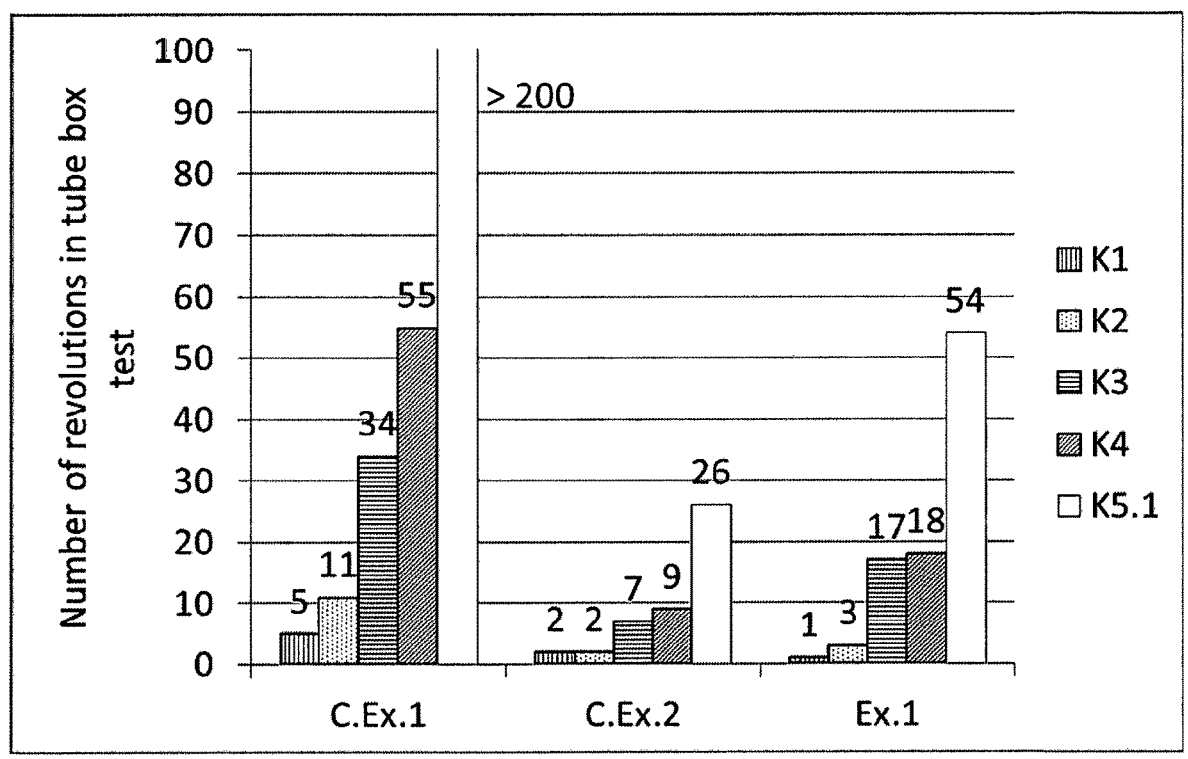
FIG. 2 is a graphical illustration of the experimental results of the test for dispersibility of non-woven fabrics.

The results for the dispersibility are shown in FIG. 2. In FIG. 2, the numbers of revolutions in the tube text box are indicated for achieving the following criteria:

K1: individual fibers are released from the fabric
K2: fiber agglomerates are released from the fabric
K3: the fabric disintegrates into 2-3 parts
K4: the fabric disintegrates into 4-5 parts
K5.1: 95% of the fabric is dispersed into individual fibers The lower the number of revolutions required for fulfilling these criteria, the better is the dispersibility of the non-woven fabric.

As it is evident from these results, the dispersibility of a non-woven fabric comprising thermoplastic fibers (Comparative Example 1) is insufficient. On the other hand, the dispersibility of both Comparative Example 2 and Example 1 is good.

While the present invention has been described in detail by way of specific embodiments and examples, the invention is not limited thereto and various alterations and modifications are possible, without departing from the scope of the invention.

The invention claimed is:

1. A dispersible non-woven fabric, comprising
   natural pulp fibers in an amount of from 70 to 90 wt.-% based on the total weight of the non-woven fabric, wherein the natural pulp fibers have an average fiber length of from 1.0 to 4.0 mm and at least 50% of the natural pulp fibers have a fiber coarseness of from 1.28 to 1.35 dtex; and
   cellulosic fibers in an amount of from 10 to 30 wt.-% based on the total weight of the non-woven fabric, wherein at least a part of the natural pulp fibers and of the cellulosic fibers are entangled with each other.

2. The dispersible non-woven fabric according to claim 1, wherein the natural pulp fibers comprise softwood pulp.

3. The dispersible non-woven fabric according to claim 1, wherein the natural pulp fibers comprise pulp fibers from conifers.

4. The dispersible non-woven fabric according to claim 1, wherein the cellulosic fibers are selected from the group consisting of cellulose fibers and regenerated cellulose fibers.

5. The dispersible non-woven fabric according to claim 4, wherein the regenerated cellulose fibers are selected from the group consisting of viscose or lyocell.

6. The dispersible non-woven fabric according to claim 1, wherein the cellulosic fibers have a fiber length of from 8 to 14 mm.

7. The dispersible non-woven fabric according to claim 1, wherein the non-woven fabric does not comprise any one of a binder, thermoplastic fibers and a wet-strength agent.

8. The dispersible non-woven fabric according to claim 1, wherein the non-woven fabric is treated with a liquid or a lotion.

9. A method for producing a dispersible non-woven fabric, comprising the steps of:
   (a) forming a fibrous web comprising 70 to 90 wt.-% of natural pulp fibers and 10 to 30 wt.-% of cellulosic fibers;
   (b) entangling at least a part of the natural pulp fibers and of the cellulosic fibers with each other by subjecting the fibrous web to a water-jet treatment; and
   (c) drying the entangled fibrous web,
   wherein the natural pulp fibers have an average fiber length of from 1.0 to 4.0 mm and at least 50% of the natural pulp fibers have a fiber coarseness of from 1.28 to 1.35 dtex.

10. The method according to claim 9, wherein in step (a) the fibrous web is formed by a wet-laid process.

11. A wipe or tissue comprising the dispersible non-woven fabric according to claim 1.

12. The wipe or tissue according to claim 11, being a dry wipe or a wet wipe.

13. The wipe or tissue according to claim 11, wherein the wipe or tissue is selected from the group consisting of toilette wipes, toilet tissues, facial wipes, cosmetic wipes, baby wipes, sanitary wipes, kitchen tissue, paper towel, handkerchiefs, cleaning tissue and cleansing tissue.

* * * * *